(12) United States Patent
Sheppard

(10) Patent No.: US 8,141,790 B2
(45) Date of Patent: Mar. 27, 2012

(54) THERMAL BYPASS VALVE WITH PRESSURE RELIEF CAPABILITY

(75) Inventor: Jeffrey Owen Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 796 days.

(21) Appl. No.: 12/275,583

(22) Filed: Nov. 21, 2008

(65) Prior Publication Data

US 2010/0126594 A1  May 27, 2010

(51) Int. Cl.
*F01P 7/16* (2006.01)
(52) U.S. Cl. ........ 236/34.5; 236/34; 236/99 R; 236/100; 236/99 K; 236/99 J
(58) Field of Classification Search .......... 236/34, 236/34.5, 93 R, 99 J, 99 K, 99 R, 100; 137/597
See application file for complete search history.

(56) References Cited

U.S. PATENT DOCUMENTS

| | | |
|---|---|---|
| 3,877,514 A | 4/1975 | Beck |
| 3,913,831 A | 10/1975 | Talak |
| 5,564,317 A | 10/1996 | Gilroy et al. |
| 5,791,557 A | 8/1998 | Kunze |
| 5,992,515 A | 11/1999 | Spiegel |
| 6,117,312 A | 9/2000 | Mees et al. |
| 6,253,837 B1 | 7/2001 | Seiler et al. |
| 6,830,527 B2 | 12/2004 | Wakayama |
| 7,540,431 B2 | 6/2009 | Kozdras et al. |
| 2006/0108435 A1* | 5/2006 | Kozdras et al. ............. 236/93 R |
| 2006/0237184 A1 | 10/2006 | Peric |
| 2008/0023190 A1 | 1/2008 | Peric |
| 2008/0029246 A1* | 2/2008 | Fratantonio et al. .......... 165/103 |

FOREIGN PATENT DOCUMENTS

| | | |
|---|---|---|
| CA | 2504757 | 4/2005 |
| CA | 2504759 | 4/2006 |

OTHER PUBLICATIONS

Thermal Bypass Valves, published by Dana Corporation at least as early as Mar. 14, 2008.

* cited by examiner

*Primary Examiner* — Cheryl J Tyler
*Assistant Examiner* — Jonathan Bradford
(74) *Attorney, Agent, or Firm* — Ridout & Maybee LLP

(57) ABSTRACT

A by-pass valve for a heat exchanger circuit that includes a cooler has a chamber and ports for flow of fluid into and out of this chamber. A thermally sensitive actuator is mounted in the chamber and can extend or retract in dependence on its body temperature as influenced by temperature of the fluid. A by-pass valve seat is arranged in a valve housing along with a by-pass valve member movable by the actuator into or out of engagement with the seat. A relief valve is mounted in the chamber and has a relief valve member movable between closed and open positions in order to close or open pressure relief ports. This relief valve member is biased towards the closed position. Excessive pressure build up in an end section of the chamber causes the relief valve member to move to its open position.

20 Claims, 11 Drawing Sheets

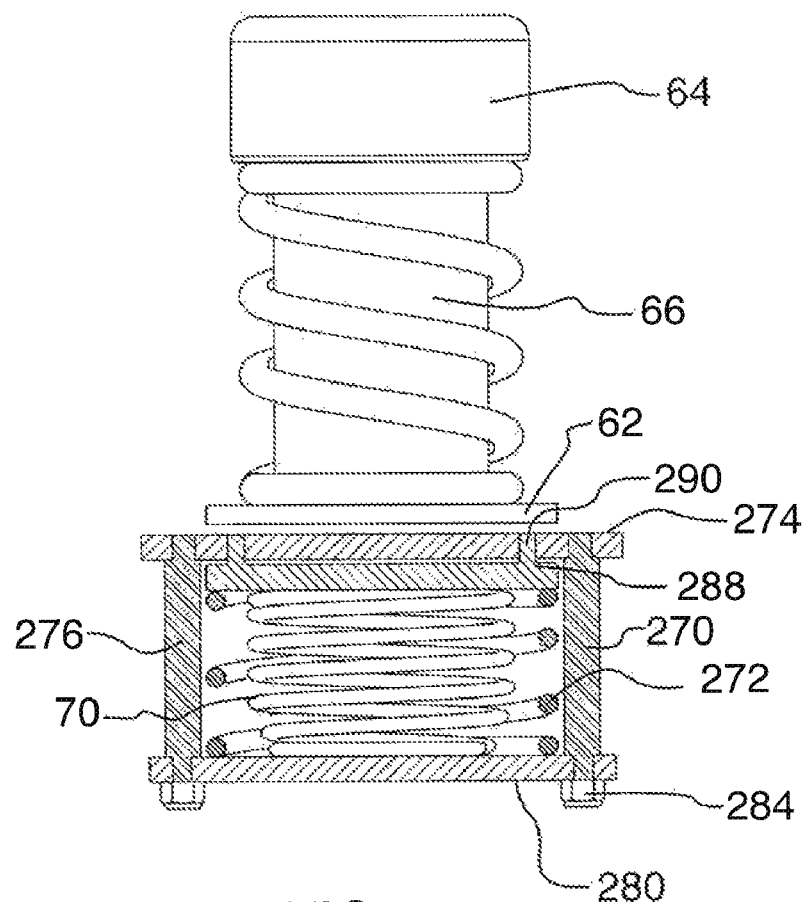
FIG.21
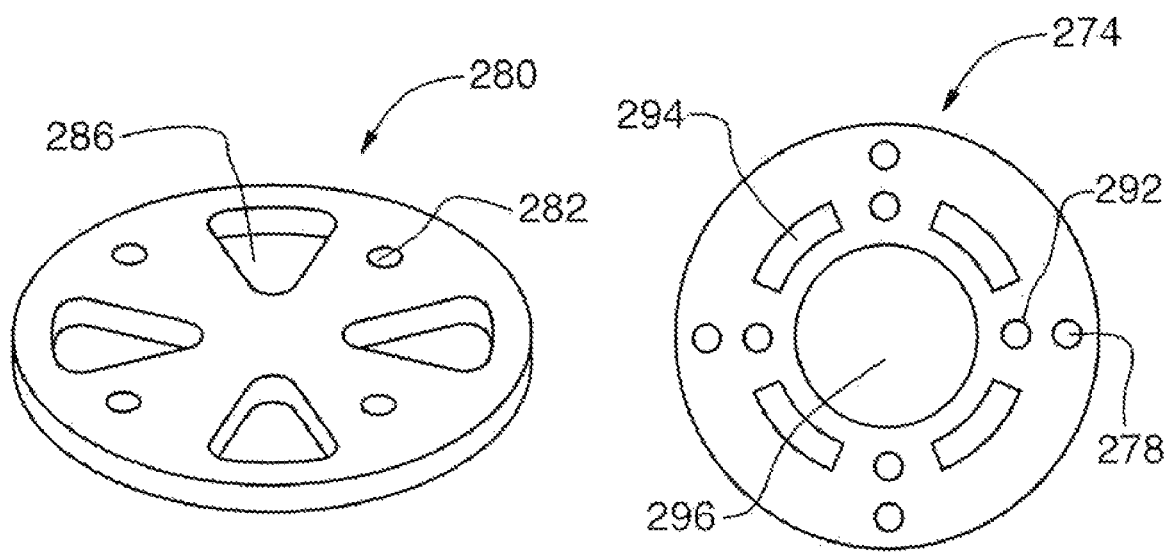
FIG.22
FIG.23

THERMAL BYPASS VALVE WITH PRESSURE RELIEF CAPABILITY

BACKGROUND OF THE INVENTION

This invention relates to by-pass valves for heat exchanger circuits in which there is a cooler or cooler unit for a heat exchange fluid.

In the automotive industry, for example, heat exchangers are used to cool or heat certain fluids, such as engine oil or transmission fluid or oil. In the case of transmission fluid for instance, a heat exchanger, which can be called a cooler, is used to cool the transmission fluid. The heat exchanger is usually located remote from the transmission and, in normal operating conditions, it receives hot transmission oil from the transmission through supply tubing, cools it and delivers it back to the transmission through return tubing. However, when the transmission is cool, such as at start up conditions, the transmission oil or fluid is very viscous and does not flow easily through the heat exchanger, if at all. In such cases, the transmission can be starved of oil and this may cause damage or erratic performance. Cumulative damage to the transmission can also occur if the quantity of oil returned is adequate but is over cooled due to low ambient temperatures. In this case, for instance, moisture condensation in the oil (that would otherwise be vaporized at higher temperatures) may accumulate and cause corrosion or oil degradation.

In order to overcome the cold flow starvation problem, various solutions have been proposed in the past. One solution is to use a by-pass path between the heat exchanger supply and return lines, often with a heat actuated by-pass valve located in the by-pass path. An example of a by-pass valve is shown in U.S. Pat. No. 6,253,837 issued Jul. 3, 2001 to Long Manufacturing Ltd. Using a thermal by-pass valve to by-pass a cooler can provide rapid warm up of the oil or fluid, which in addition to addressing the concerns noted above can also result in improved fuel economy.

U.S. Pat. No. 5,791,557 issued Aug. 11, 1998 to Behr Thermot-tronik GmbH & Co. describes another form of thermostatic valve which provides a by-pass capability. This valve includes a valve housing and a preassembled construction unit insertable into the housing. The construction unit includes a thermostatic working element with a restoring spring and movable valve elements. The collar of the working element forms a valve slide for an inflow valve which, under cold conditions, blocks the connection of the inflow between an inlet and an outlet. A lower section of the valve chamber is used as a by-pass duct which can be blocked off by means of a by-pass valve in the direction of a return flow. The by-pass valve includes a by-pass valve seat and a by-pass valve disk. The seat is moulded to a holding part which is fitted into a section of the chamber of the housing.

In one known form of by-pass valve arrangement for an automotive transmission wherein the by-pass valve is connected to a cooler by means of an outlet port located at one end section of the valve chamber and by means of an inlet port located at an opposite end section of the valve chamber, a thermally sensitive actuator or wax motor is disposed in the valve chamber so that it has a first end located in the one end section and a second end disposed towards the opposite end section. A piston extends from the first end of the actuator and engages the adjacent end of the valve chamber by projecting into a suitable recess. A valve seat is located in the valve chamber adjacent the second end of the actuator and this seat extends around a by-pass port which can be closed or opened by means of an annular valve ring mounted for sliding movement on the actuator body. A return spring extends through the by-pass port and engages the second end of the actuator body, thereby urging it away from the valve seat.

A difficulty with this forward flow arrangement for a by-pass valve is that there is no provision for pressure relief in the event of excessive pressure build up in the one end section of the valve chamber that contains the actuator. It is desirable to provide a pressure relief capability in order to avoid undue wear on or possible failure of components in the by-pass valve unit and also to help avoid premature wear on or failure of the cooler unit.

SUMMARY OF THE DISCLOSURE

According to one exemplary embodiment of the present disclosure, a by-pass valve apparatus for a heat exchanger circuit for cooling a heat exchange fluid comprises a by-pass valve device having a valve housing formed with a valve chamber with opposite first and second end sections, a first port for inflow of the heat exchange fluid into the second end section, a second port for outflow of the heat exchange fluid from the second end section to a cooler, a third port for outflow of the heat exchange fluid from the first end section, and a fourth port for the inflow of the heat exchange fluid into the first end section from the cooler. A thermally sensitive actuator is mounted in the chamber and is adapted to extend or retract in dependence on its temperature which is influenced by the temperature of the heat exchange fluid during use of the valve apparatus. The actuator has a first end disposed in the second end section and a second end disposed towards the first end section. A by-pass valve seat is provided in the valve housing and a by-pass valve member is mounted in the valve chamber and movable by extension or retraction of the actuator into engagement with or disengagement from the valve seat in order to open or close a by-pass port for flow of the heat exchange fluid from the second end section to the first end section. There is also a relief valve mechanism mounted in the valve chamber and having at least one relief valve member movable between a closed position where at least one pressure relief port is closed and an open position where said at least one pressure relief port is open. The at least one relief valve member is biased towards the closed position. In event of excessive pressure build up in the second end section of the chamber during use of the by-pass valve, the pressure of the heat exchange fluid in the second end section causes the at least one relief valve member to move to its open position and thereby reduce the excessive pressure.

In an exemplary version of this valve apparatus, the actuator is a wax motor having a piston engaging one end of the valve chamber and a cylindrical body in which the piston is slidably mounted and from which the piston extends. A return spring is mounted in an opposite end section of the valve chamber and has one spring end engaging the actuator at a closed end thereof located remote from the piston.

In another exemplary embodiment of a by-pass valve according to the present disclosure, the by-pass valve for a heat exchanger circuit for cooling a heat exchange fluid includes a valve housing formed with a valve chamber and having first and second ports for respectively supplying and returning the heat exchange fluid to and from the chamber and third and fourth ports for respectively supplying and returning the heat exchange fluid to and from a cooler. The valve also has a thermally sensitive actuator mounted in the chamber and having a shaft section and a piston extending from a first end of the actuator. The piston is adapted to extend from or retract into the first end in dependence on the temperature of the shaft section, this piston extending into and held by a recess formed in the housing at one end of the chamber so that the shaft section is movable in the chamber and responds to extension or retraction of the piston. A spring enclosure is mounted in a by-pass section of the chamber adjacent a second end of the actuator remote from the first end. This spring enclosure forms a valve seat having a by-pass port through which the heat exchange fluid can flow in a cold by-pass state of the valve and forming at least one pressure relief port. There is at least one port closing device mounted in or on the enclosure and adapted under normal operating conditions to close the at least one pressure relief port. A by-pass valve member is mounted on the shaft section and is movable by the actuator from a first position where the by-pass port is open to a second position where the by-pass port is closed by the by-pass valve member. A return spring is mounted in the enclosure and has one spring end engaging the actuator at the second end thereof so as to bias the shaft section away from the valve seat and the by-pass port. In the event of excessive pressure build-up in the chamber on the actuator side of the valve seat during use of the by-pass valve, the at least one port closing device moves to an open position and allows the heat exchange fluid to flow through the at least one pressure relief port and thereby reduce the pressure build-up.

In an exemplary version of this by-pass valve, the spring enclosure includes first and second enclosure sections detachably connected to each other with the first enclosure section forming the valve seat, which is annular and extends around the by-pass port, and the at least one pressure relief port.

According to another example embodiment of a by-pass valve according to the present disclosure, a by-pass valve for mounting between a transmission and a cooling unit used to cool a transmission fluid for the transmission includes a valve housing having a valve chamber, first aperture means connected to the valve chamber for supplying and returning the transmission fluid to and from the transmission and second aperture means connected to the valve chamber for supplying and returning the transmission fluid to and from the cooling unit. The valve has a thermally sensitive actuator mounted in the chamber and having an actuator body with opposite first and second ends and a piston extending from the first end. The piston is adapted to extend from the first end or retract into the body in dependence on the temperature of the body. The piston is adapted and arranged to engage the housing at one end of the valve chamber so that the body is linearly movable in the chamber in response to extension or retraction of the piston. A valve seat member is provided in the valve chamber adjacent the second end of the actuator, this seat member forming a by-pass opening through which the transmission fluid can flow in a first direction in a cold by-pass state of the valve. This seat member also forms a pressure relief port arrangement through which the transmission fluid can flow in a reverse direction opposite the first direction. A relief valve mechanism is mounted in the valve chamber and is movable between a closed position where the pressure relief port arrangement is closed and an open position where the pressure relief port arrangement is open. This relief valve mechanism is biased towards the closed position. There is also a by-pass valve member mounted in the valve chamber and movable by the actuator body from a by-pass position where the by-pass opening is open to a valve seat engaging position where the by-pass opening is closed. A return spring is provided to bias the actuator to a piston retracted position. This spring has a first spring end engaging the second end of the actuator body and a second spring end engaging a supporting surface located within the chamber. In the event of excessive pressure build-up in a section of the chamber containing the actuator during use of the by-pass valve, the relief valve mechanism moves to its open position to allow the transmission fluid to flow through the pressure relief port arrangement and thereby reduce the pressure build-up.

In an exemplary version of this by-pass valve, the pressure relief port arrangement comprises a plurality of pressure relief ports distributed around an annular top section of the valve seat member and the relief valve mechanism includes an annular ring member mounted below the annular top section and biased by a coil-type spring.

BRIEF DESCRIPTION OF THE DRAWINGS

Example embodiments of the invention will now be described with reference to the accompanying drawings, throughout which similar elements and features are denoted by the same reference numbers, and in which:

FIG. 21 is a schematic side view similar to FIG. 19 but showing a further form of relief valve assembly and spring enclosure;

FIG. 22 is a top view of the spring seat member used in the valve assembly of FIG. 21; and FIG. 23 is a top view of an annular top member or plate used in the spring cage member show in FIG. 21.

DESCRIPTION OF EXAMPLE EMBODIMENTS

Figure 1:
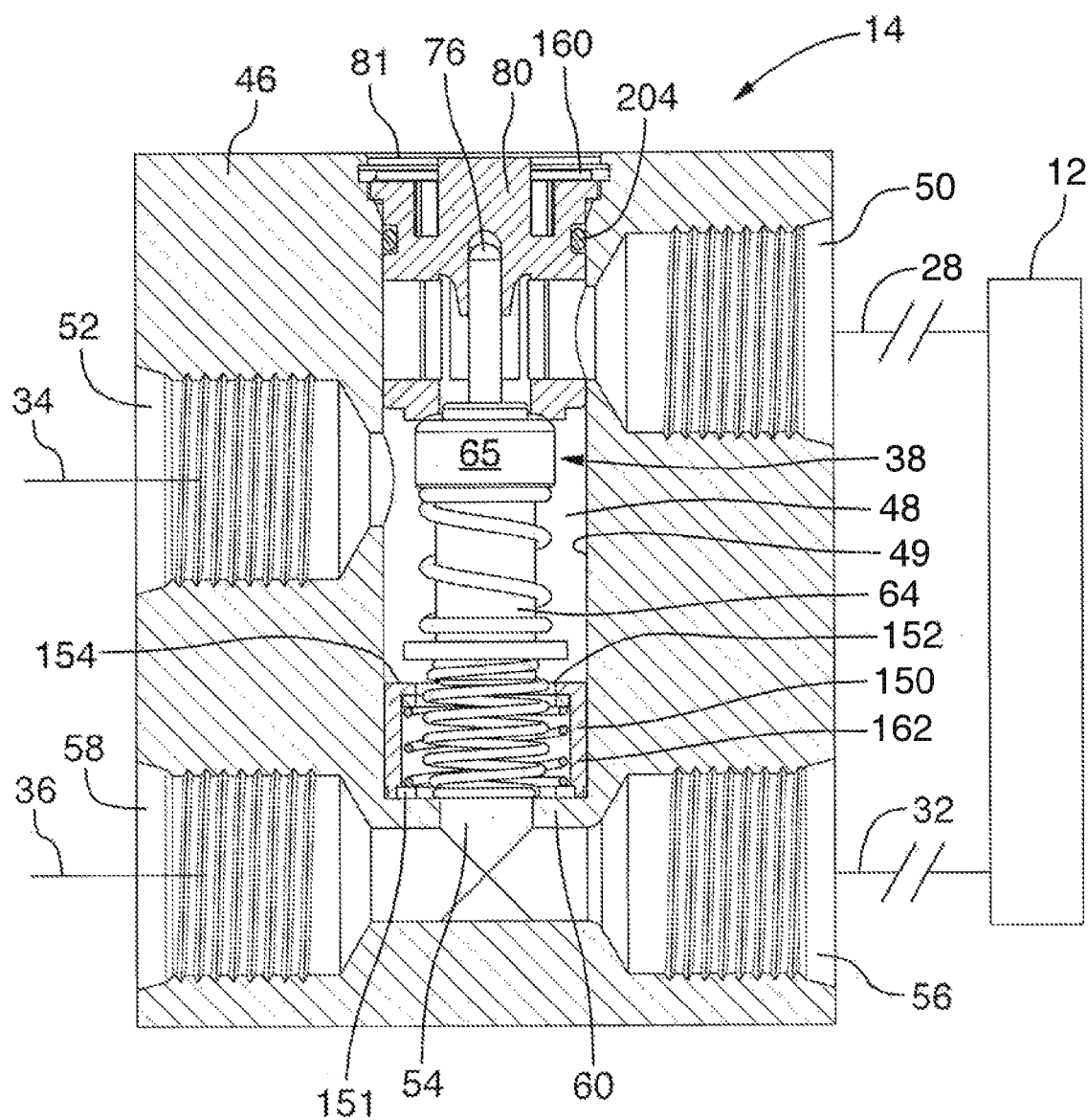
FIG. 1 is an elevational view, partly in cross-section, of a by-pass valve according to an example embodiment of the invention, showing the by-pass valve in an open position allowing the heat exchange fluid to by-pass a heat exchanger.
Figure 2:
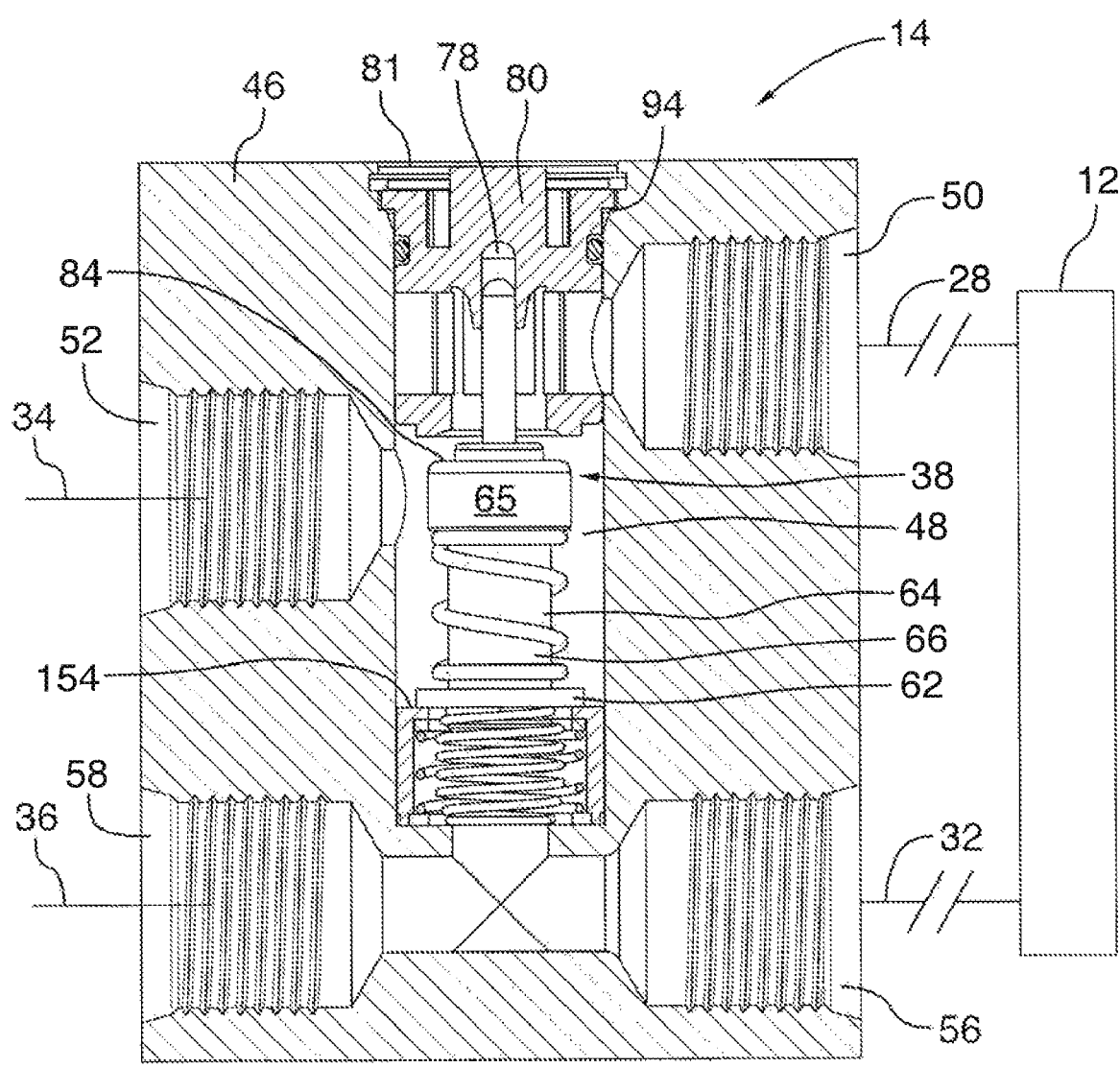
FIG. 2 is another elevational view, partly in cross-section, showing the by-pass valve in its closed position.
Figure 3:
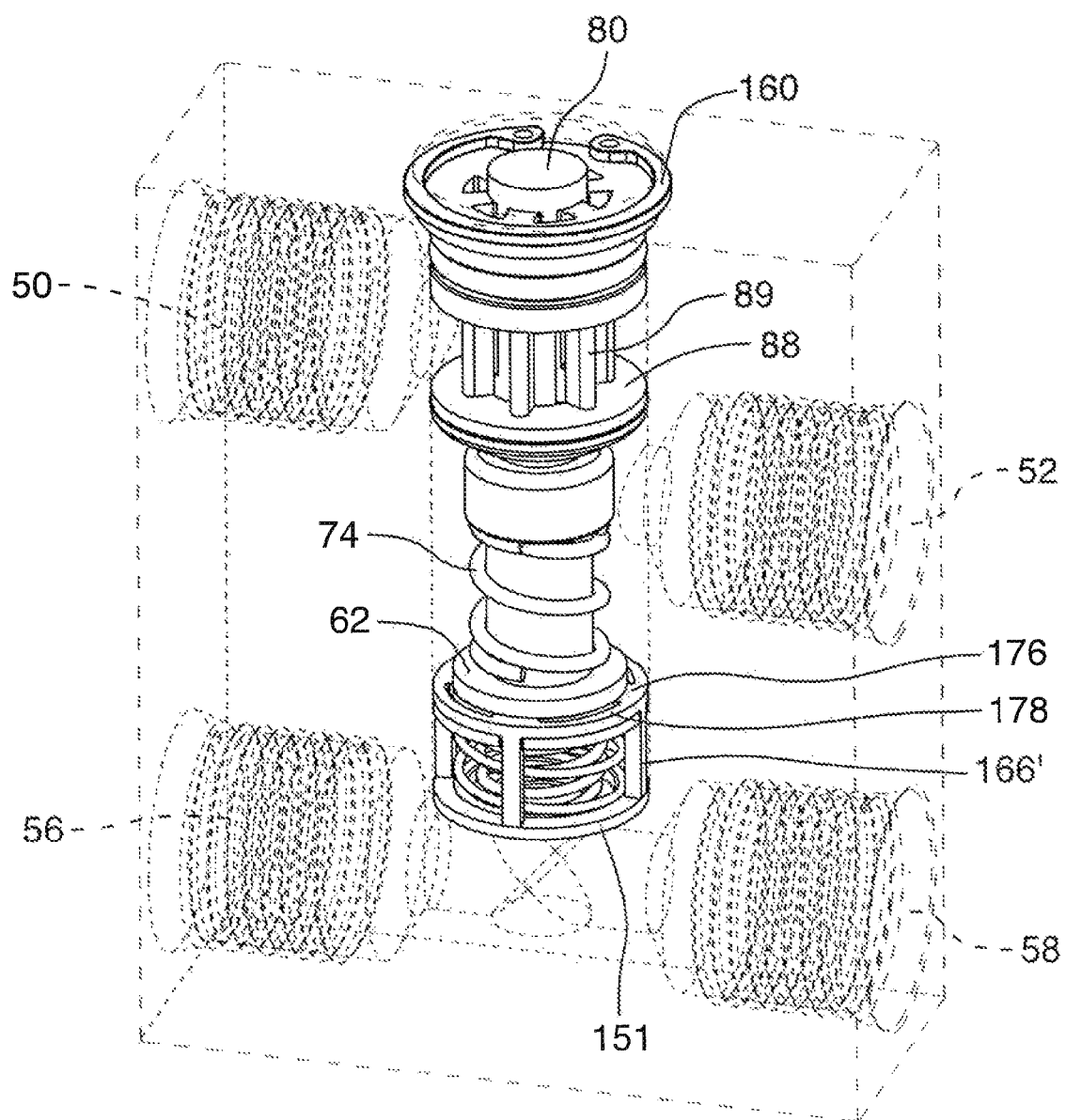
FIG. 3 is an isometric view of the by-pass valve as seen from above with the valve housing being shown in dash lines in order to show the internal valve assembly.

With reference to FIGS. 1 and 2, there is shown an example of a by-pass valve, indicated generally by reference 14, which can be used in a heat exchanger circuit to control the flow of a fluid, such as transmission fluid, to a heat exchanger 12 to which first and second conduits 28 and 32 are connected. The heat exchanger 12 can be a cooler or cooler unit of standard construction if it is being used to cool transmission fluid or transmission oil. The conduits 28, 32 are connected to an outlet port 50 and an inlet port 56 of the valve. These ports can also be considered aperture means which are connected to a valve chamber 48 for supplying and returning the transmission fluid to and from the heat exchanger 12. Conduits 34, 36 are also connected to ports 52, 58 in the valve 14 and these conduits 34, 36 can be connected to a vehicle component such as a transmission (not shown). The valve 14 is referred to as a four port by-pass valve because the four conduits 28, 32, 34 and 36 are connected to the valve.

The valve 14 has a valve housing 46 having the valve chamber 48 formed therein. Formed in the chamber is a first by-pass port 54, around which extends annular end wall 60. The chamber 48 can be substantially cylindrical and defined by a cylindrical wall 49. The housing 46 can be formed of steel or another metal or alternatively a mouldable material such as a plastic material which may be thermoplastic or a thermosetting material and which may contain reinforcement such as glass fiber or particulate reinforcement. The housing can define the aforementioned outlet port 50 and the main inlet port or aperture 52. The chamber 48 communicates through the port 54 and a by-pass port formed in a spring enclosure 150 described below and shown separately in FIG. 9. The ports 50, 52, 56 and 58 can be internally threaded as shown for receiving threaded end portions of the conduits 28, 34, 32 and 36 respectively. However, the conduits and ports could alternatively be connected using other methods including, for example, moulding the ports around the conduits.

Figure 11:
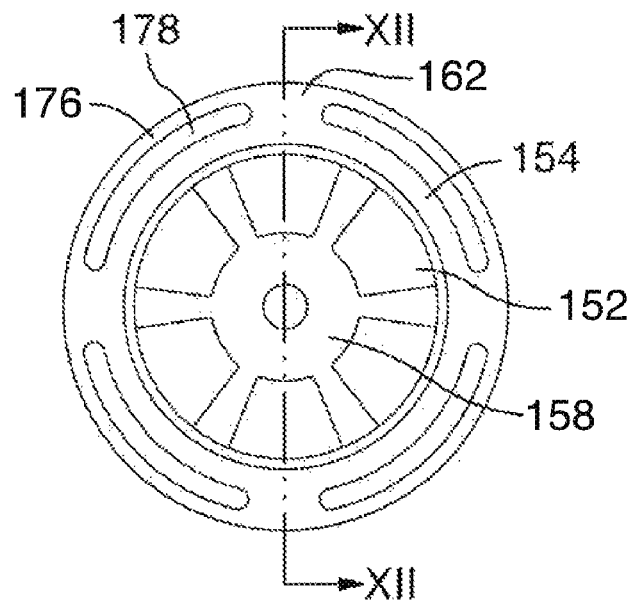
FIG. 11 is a top view of the assembly of FIG. 9.

The annular end wall 60 faces the valve chamber and provides support for the spring enclosure 150. By-pass valve assembly 38 is located within the housing and is operative to open and close a second by-pass port 152 which is formed by the spring enclosure (see FIGS. 9, 11 and 12). The valve assembly 38 includes a thermally sensitive actuator 64 which is sometimes referred to as a thermal motor. In the illustrated embodiment, it is a piston and cylinder type device wherein the cylinder body is filled with a thermally sensitive material such as wax, that expands or retracts causing the actuator to extend axially upon being heated to a predetermined temperature by the heat exchange fluid.

As shown in FIGS. 1 to 4, the actuator 64 is located along a central axis of the valve chamber and the port 54. The cylinder of the actuator forms a central shaft section 66 disposed along a central axis of the chamber. The shaft section has a closed bottom end with a diameter less than the by-pass port 152. A by-pass valve member, which in the illustrated embodiment is an annular ring 62, is slidably mounted on the shaft section and is located adjacent to its closed end, i.e. the bottom end as illustrated, in its normal or "cold" position as indicated in FIG. 1. In the "hot" position shown in FIG. 2, the by-pass valve member engages an annular valve seat 154 extending around the port 152, thereby closing this valve port and preventing any by-pass flow into the chamber.

Figure 5:
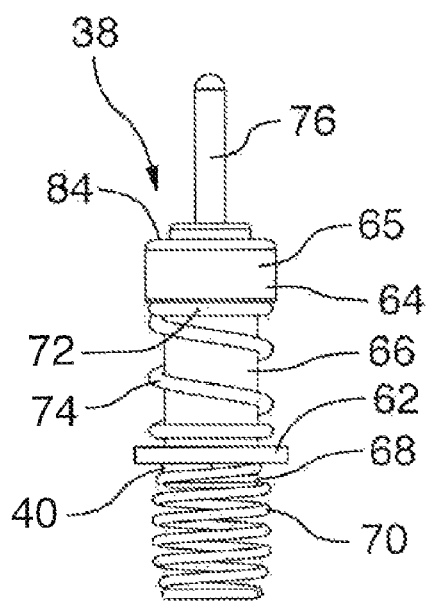
FIG. 5 is an elevational view of a by-pass valve assembly used in the valve of FIGS. 1 and 2.

As shown in FIG. 5, the by-pass valve assembly includes a return spring 70 that has a first spring end engaging the actuator at its closed end (also referred to herein as the second end of the actuator) so as to bias the shaft section away from the valve seat 154. The end 40 can be attached to the actuator by being located in a groove (not shown) formed in a closed end portion 68. The return spring has an opposite second end which engages a spring seat 158 formed by a lower one of two enclosure sections that form the enclosure 150. The spring 70 also acts as a stop for preventing the ring 62 from sliding off the shaft of the actuator when the ring is lifted off the valve seat (as shown in FIG. 1).

As best seen in FIG. 5, the body of the actuator includes an annular shoulder 72 and an override spring 74 is mounted on the body between the shoulder and the ring 62. The spring 74 urges or biases the ring towards the return spring 70, and thus towards the valve seat 154.

Figure 6:
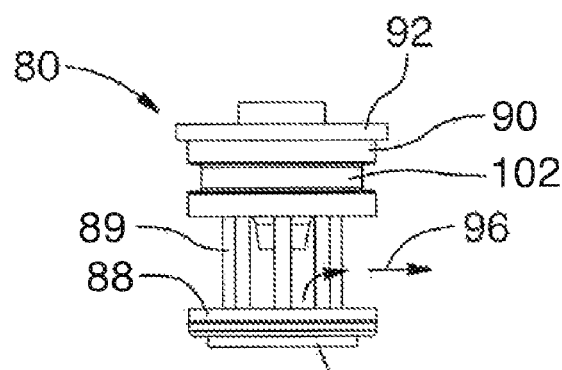
FIG. 6 is a side view of a closure cap of the by-pass valve of FIG. 1.
Figure 7:
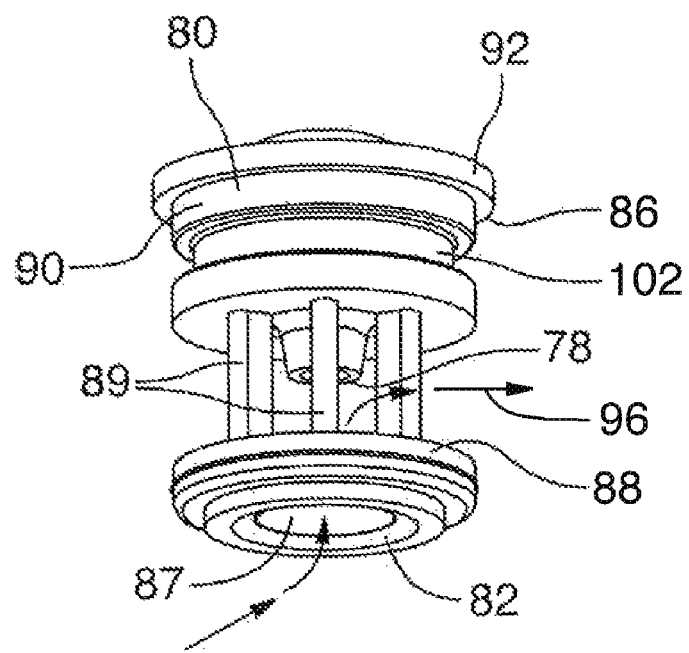
FIG. 7 is a perspective view of the closure cap of FIG. 6.

The housing 46 has an opening 81 at one end and through this opening the valve assembly 38 can be inserted into the chamber during assembly of the by-pass valve. A closure cap 80 shown in greater detail in FIGS. 6 and 7 is inserted into the opening to seal the chamber and can be considered part of the housing 46. The cap 80 can be formed from a mouldable plastic material and may contain reinforcement such as glass fiber. The closure cap can in some versions be formed from steel or other metals.

The actuator 64 has a piston 76 extending from a first end of the actuator. This piston is attached to or fitted into an axial recess 78 formed in the cap. The piston is adapted to extend from or retract into the first end of the actuator in dependence on the temperature of the shaft section 66 which is influenced by the fluid temperature. It will be understood that the shaft section is movable in the chamber in response to extension or retraction of the piston. Upward movement of the piston is limited by its engagement with the cap which can be considered a first end of the valve chamber and in particular, by its engagement with the upper end of the recess. Thus when the actuator reaches a predetermined temperature so that it extends axially, the central shaft 66 is forced downwardly through the by-pass port 152 compressing the return spring. The shoulder 72 moves down with the central shaft and presses the override coil spring 74 such that the by-pass valve member or ring 62 is pressed down to engage the valve seat 154. When the temperature in the chamber drops below the predetermined temperature, the piston retracts and the return spring urges the central shaft 66 upwardly which causes the valve member 62 to be lifted off the valve seat 154 again. This effectively opens both the upper by-pass port 152 allowing by-pass flow through both ports 54 and 152.

As is clear from FIGS. 1 and 2, the outlet port 50 and the main inlet port 52 are offset relative to each other along the axis of the valve assembly 38. The cap 80 defines part of the flow path between these two ports as indicated in part by the arrows 96 shown in FIG. 6. The cap includes an upper cylinder plug portion 86 and a spaced apart disc-like annular portion 88 which are joined together by a series of spaced apart vanes or struts 89. The plug portion 86 defines an outer cylindrical wall 90 sized to fit in the cylindrical passage forming the valve chamber and a larger diameter head 92. The passage forming the chamber has an outer end section of larger diameter in which the cap head 92 is located. The cap is located in the cylindrical passage by engagement between the cap head and a cap seat 94 formed about the circumference of the passage. An annular groove 102 can be formed in the cylindrical wall 90 to accommodate an o-ring seal 204.

The ring portion 88 of the cap defines a central opening or valve port 87. In the mode of operation illustrated by FIG. 2, heat exchange fluid flows in from the port 52 and passes through the valve port 87 and through the vanes 89 and then out the port 50. The actuator has an enlarged cylindrical head portion 65 at the upper end of the shaft section 66. The head portion has an upper surface 84 which can cooperate with a lower surface 82 of the ring portion 88 to restrict the fluid flow through the valve port 87 in cold state of operation. Thus as shown in FIG. 1, the upper surface 84 can engage the lower surface of the cap to block the valve port whereas this is not the case in the normal flow stage shown in FIG. 2. In some example embodiments, the cap 80 does not include the lower portion 88, struts 89 or valve port 87. Cap 80 can be ultrasonically welded to the main portion of the housing when the housing is plastic in order to seal the opening 81.

Figure 4:
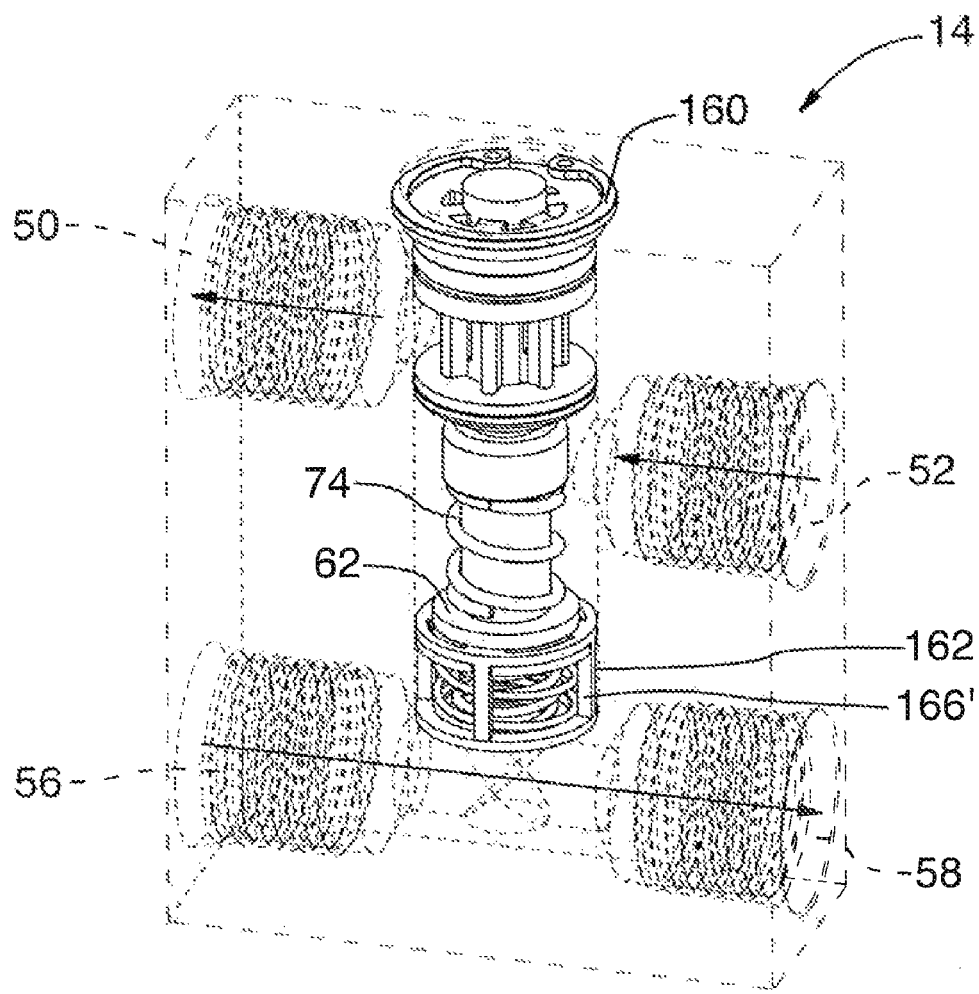
FIG. 4 is an isometric view similar to FIG. 3 but with arrows added to illustrate the flow direction of the heat exchange fluid.

Another way of holding the cap in the opening 81 is illustrated in FIGS. 1, 2 and 4. In particular a C-clip 160 is inserted into the opening to engage the top of the cap, the clip being held in an annular recess formed around the opening.

Figure 8:
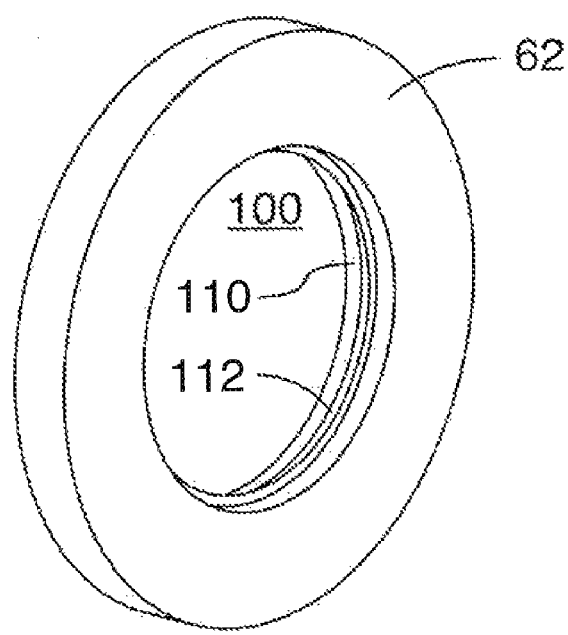
FIG. 8 is a perspective view of an annular ring used in the by-pass valve of FIG. 1.

The valve member or ring 62 shown separately in FIG. 8 can be formed from a synthetic material such as a plastic. For example, for various applications suitable materials can be polyamide 4/6 or polyamide 66 but suitable nylons can also be used. The ring has a cylindrical inner surface 110 defining a central opening 100 through which the shaft 66 passes. A circumferentially inwardly extending wiper or rib 112 extends midway around the surface 110 for sliding engagement of the shaft. In one particular embodiment, the rib 112 has a thickness between 1/3 to 1/7 of the thickness of the ring. One example of the ring has a thickness of three mm with a central opening 100 having an inner diameter of 8.43 to 8.48 mm. The dimensions of the wiper are selected to facilitate use of the ring 62 over the LMC-MMC range of the shaft 66 (where LMC refers to "lease material condition" and MMC refers to "maximum material condition"), while providing a leak resistant non-binding seal between the ring and the shaft.

Figure 12:
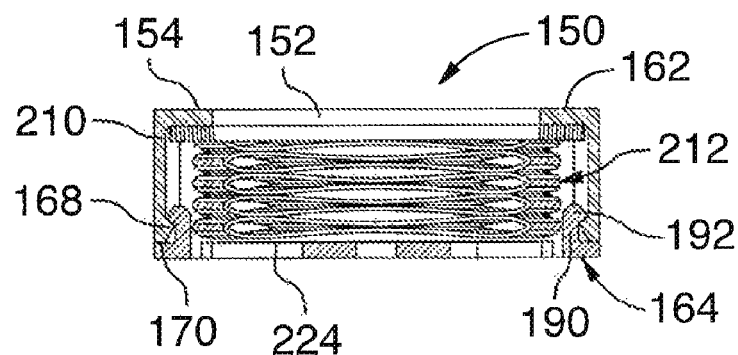
FIG. 12 is cross-sectional view of the assembly of FIG. 9, this view taken along the line XII-XII of FIG. 11.
Figure 13:
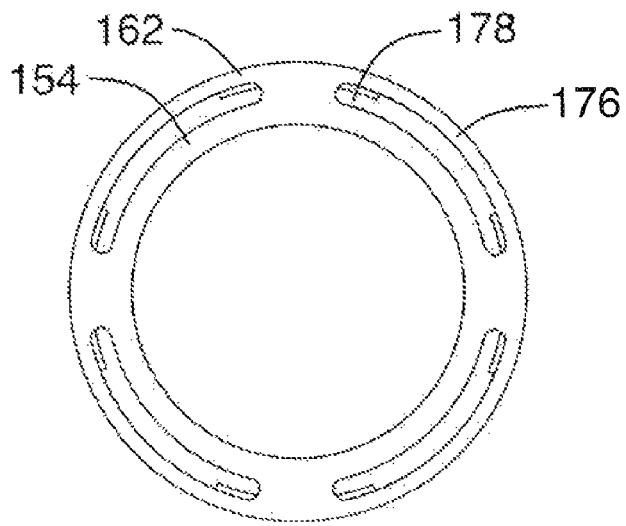
FIG. 13 is a top view of the valve seat member only used in the assembly of FIG. 9.
Figure 14:
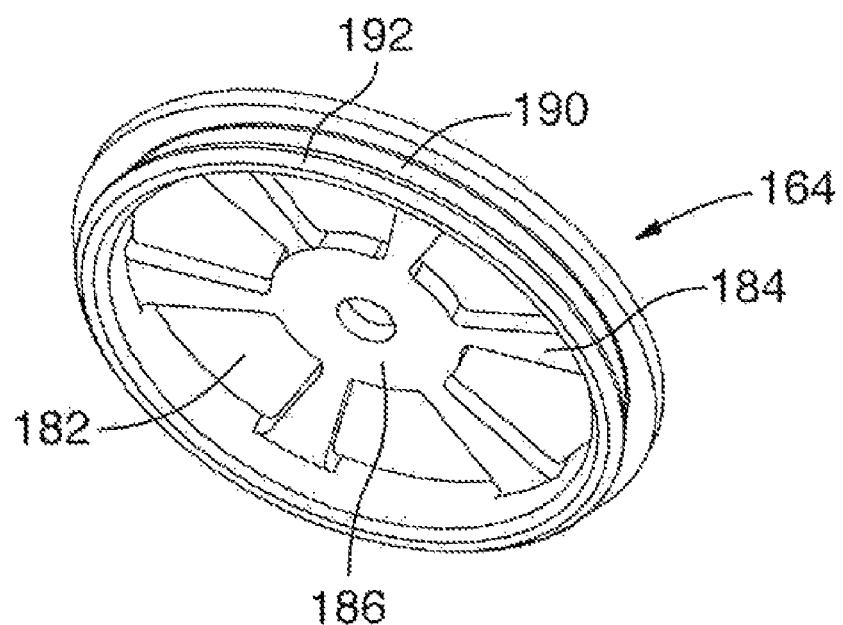
FIG. 14 is an isometric view showing a top side of a spring seat member forming the bottom side of the assembly of FIG. 9.
Figure 15:
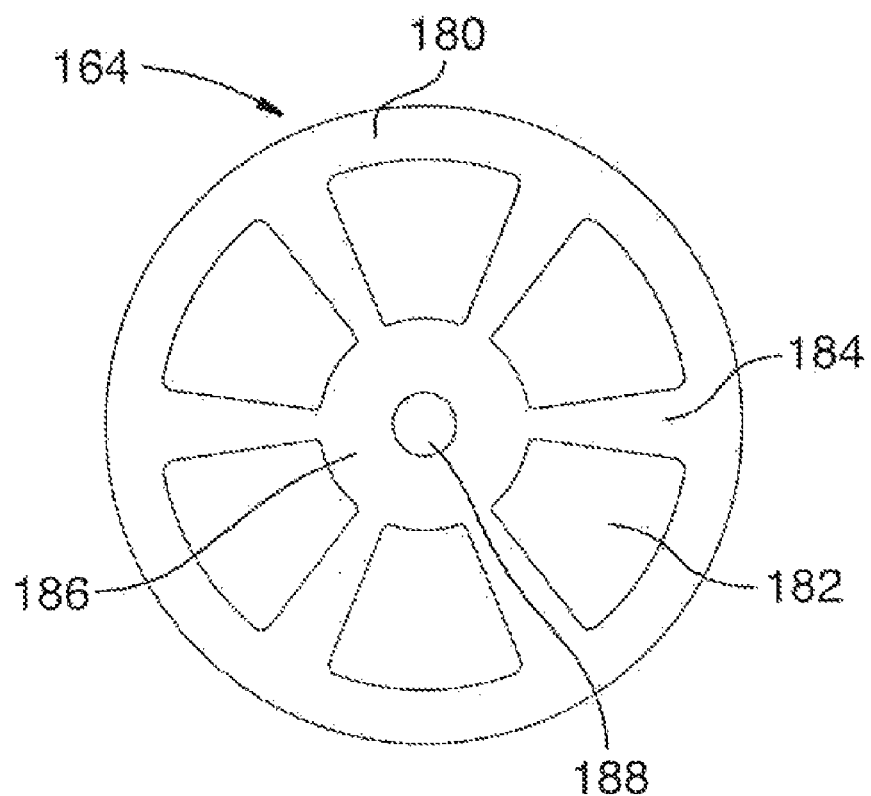
FIG. 15 is a bottom view of the spring seat member of FIG. 14.

The details of the spring enclosure 150 as illustrated by FIGS. 9 to 18 will now be described. The spring enclosure is mounted in a by-pass section of the valve chamber 48, that is a section that adjacent to the by-pass port 54. The spring enclosure includes a first enclosure section 162 and a second enclosure section 164 shown separately in FIGS. 14 and 15. These two sections are detachably connected to each other in the exemplary embodiment shown in FIGS. 9 and 12. The first section 162 has four legs extending downwardly from the valve seat 154 (as seen in FIG. 12). These legs 166 are made of a resilient material so that they can bend outwardly for attachment of the second section 164. Each leg is formed with an inner, sloping end flange 168 at its free end as shown in FIG. 12. The end flange has an inwardly and downwardly facing surface at 170 which facilitates attachment of the second section 164. The legs are spaced apart by gaps 172. Each gap is defined by opposing edges 173, 174 of adjacent legs. The first section 162 has a substantially planar, circular top 176 forming the valve seat 154. At least one pressure relief port is formed in this top and, in the illustrated enclosure 150 there are four arc-shaped pressure relief ports 178. There can be more ports or fewer ports in the top, if desired. The second enclosure section shown in FIGS. 14 and 15 has a flat bottom surface 180 in which can be formed a plurality of openings 182 through which the heat exchange fluid can flow in the by-pass stage. The openings 182 are separated by flat spokes 184 of which there are six in the illustrated embodiment. The spokes extend to a circular, central hub 186 which can be formed with a center hole 188, if desired. Extending upwardly from the top surface of the section 164 is an annular rim 190 formed with an outwardly projecting flange at 192. Because of the sloping outer surface on this flange, the rim 190 can be pushed into locking engagement with the legs or connectors 166 as shown in FIG. 12. In this way the two sections 162, 164 are connected together forming a type of cage member.

Figure 16:
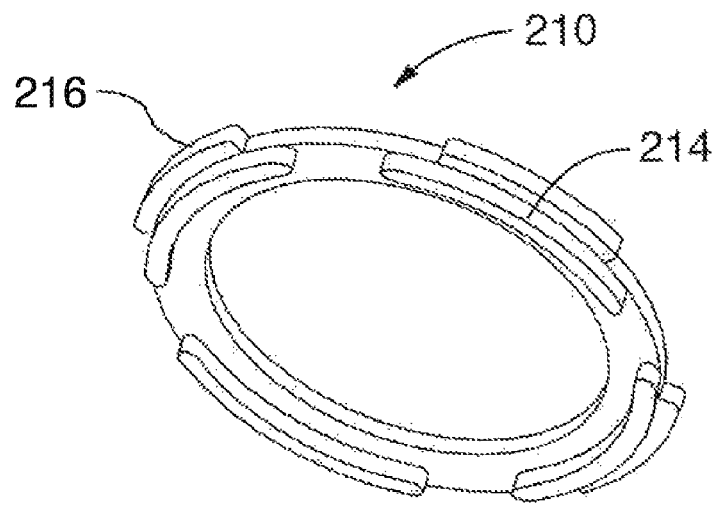
FIG. 16 is an isometric view showing a top side of an annular ring member used in the assembly of FIG. 9.
Figure 17:
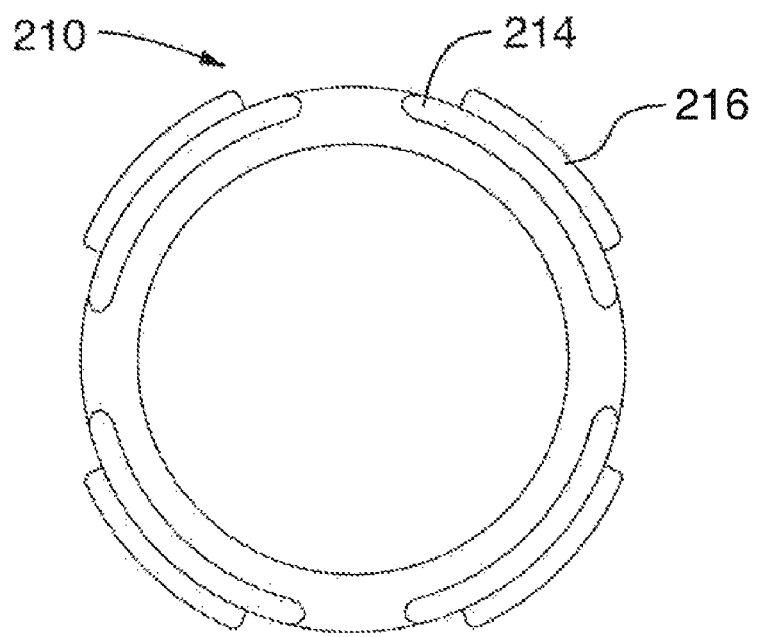
FIG. 17 is a top view of the ring member of FIG. 16.
Figure 18:
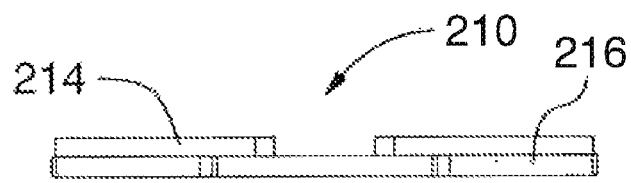
FIG. 18 is an edge view of the ring member of FIGS. 16 and 17.

The spring enclosure 150 holds two components for pressure relief purposes. Firstly it holds at least one port closing device which can be mounted in or on the enclosure and which is adapted under normal operating conditions to close the pressure relief port or ports 178. One form of port closing device in a form of an annular ring member is illustrated in FIGS. 16 to 18. This annular port closing member 210 is movable in the enclosure 150 and is guided thereby. A coil type spring 212 biases the closing member 210 to a closed position in which the port closing member closes the pressure relief ports 178. The closed position is shown in FIG. 12. This port closing member is formed with a plurality of port plugging ridges 214, the number of which corresponds to the number of pressure relief ports. In the closed position of the member 210, each of the ridges is received in a respective one of the pressure relief ports in order to close same in a sealing manner. In order to keep the ridges properly aligned, the member 210 is also formed with four radially projecting integral guides 216. These arc-shaped guides have a length corresponding to the width of the aforementioned gaps 172 formed between the legs. Thus engagement between the ends of the guides 216 and the edges 173, 174 of the legs keeps the ridges 214 in proper alignment with their respective relief ports. Note that in the spring enclosure shown in FIGS. 3 and 4, the legs 166' are substantially narrower than the legs shown FIG. 9.

Figure 9:
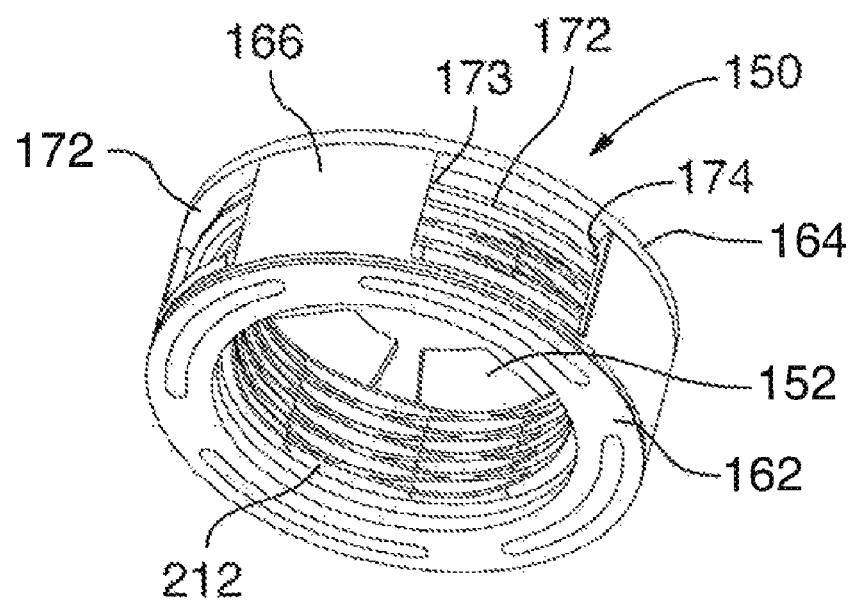
FIG. 9 is an isometric view showing a top end and one side of a by-pass valve seat and pressure relief assembly used in the by-pass valve of FIG. 1.
Figure 10:
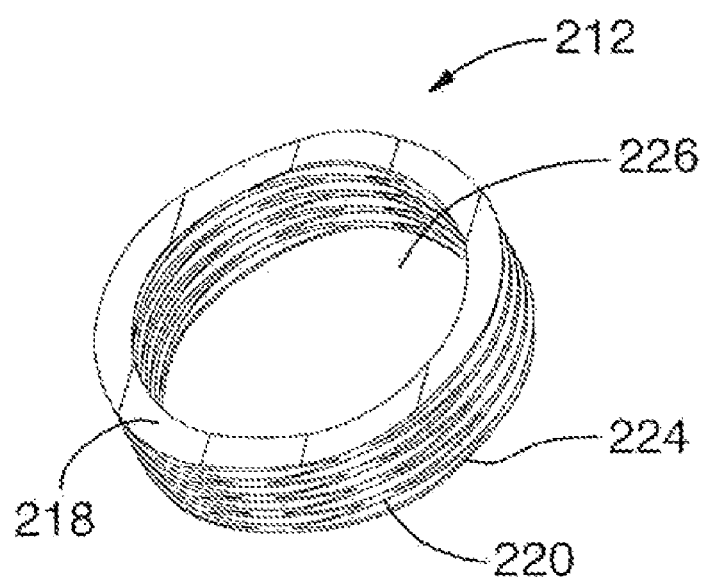
FIG. 10 is an isometric view of a spring used in the assembly of FIG. 9.

The illustrated spring 212 shown in FIGS. 9 and 10 is formed by means of a flat, carbon steel, coiled wire 218. The wire can be formed with an evenly distributed wave as indicated at 220 in a known manner. With the use of such a spring, the spring pressure is applied evenly to the bottom side of the port closing member 210. A bottom end 224 of the spring rests upon the flat spring seat formed by the second section 164.

It will be seen that the port closing member 210 and the spring 212 form one type of relief valve mechanism which is mounted in the valve chamber by means of the spring enclosure and which is movable between a closed position where the pressure relief ports 178 (which can be referred to as a pressure relief port arrangement) are closed and an open position where the pressure relief ports are open, this relief valve mechanism being biased towards the closed position by the spring 212. In the event of excessive pressure build up in the section of the chamber 48 which contains the actuator during use of the by-pass valve 14, the relief valve mechanism moves to its open position to allow the heat exchange fluid, i.e. transmission fluid, to flow through the pressure relief ports 178 thereby reducing the pressure build up.

It should be noted that the seat formed by the section 164 of the spring enclosure in one embodiment of the valve provides a seat for the return spring 70 as well as the spring 212. The return spring 70 extends through the opening 226 so that its second or bottom spring end engages the supporting surface provided by the spring seat 158. However, in the embodiment shown in FIGS. 1 and 2, the bottom end of the return spring rests on and is supported by the end wall 60 of the valve chamber. In this version of the valve, the bottom end of the spring enclosure 150 is substantially open except for an annular inner flange 151 formed by a flat ring connected to the legs 166'.

Figure 19:
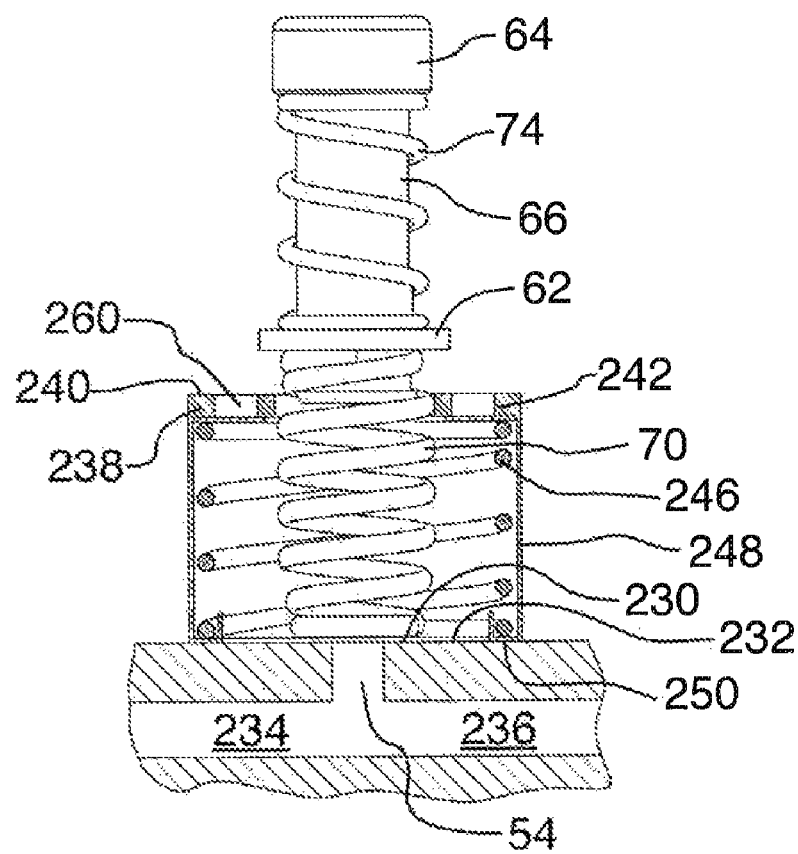
FIG. 19 is a schematic side view of an actuator, a by-pass valve member mounted thereon, and an alternate form of relief valve mechanism.
Figure 20:
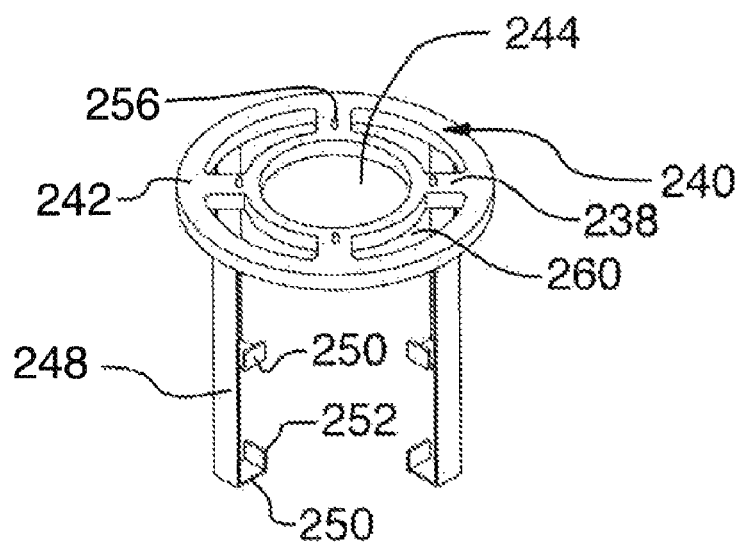
FIG. 20 is an isometric view of a flapper-type relief valve and spring enclosure of FIG. 19.

FIGS. 19 and 20 illustrate an alternate construction of a relief valve mechanism for a by-pass valve. Except for the differences noted hereinafter and shown in FIGS. 19 and 20, the construction of this alternate by-pass valve can be similar to that described above and illustrated in FIGS. 1 and 2.

Again, the return spring 70 at its first or upper end is attached to a closed end of the actuator 64. The second end of the spring engages an upwardly facing support surface 232 formed the end wall of the valve chamber and extending around the by-pass port 54. The port or bore 54, which is relatively narrow in this embodiment, leads to the main inlet port from the transmission through passage 234 and to an outlet port to the cooler through passage 236. The override spring 74 engages the by-pass valve ring 62 so as to bias this ring towards the return spring and towards a valve seat 238.

In this embodiment, the valve seat 238 is formed by a unitary cage member 240, which has a substantially planar, circular top section 242. The cage member 240 is shown separately in FIG. 20. The return spring 70 is located centrally in the cage member as shown and extends through central hole 244. Extending around the return spring is a flap valve spring 246 which is co-axial with the return spring but has a larger diameter. The spring 246 can be in the form of a standard coil spring or can be the type of coil spring shown in FIG. 10. Extending downwardly from the top section 242 are a plurality of legs 248 which are perpendicular to the top section. In the exemplary embodiment shown, there are four such legs distributed evenly about the circumference of the top section. Each leg has a radially inwardly extending foot 250 with an upwardly turned end section 252. The feet 250 provide a spring seat for the bottom end of the spring 246 as shown in FIG. 19. Although four legs are shown, there could be fewer than four legs or more than four. The upper end of the spring 246 engages against and biases at least one port closing member in the form of at least one flap valve member which can be made of a resilient spring material, namely spring steel. An inner portion of each member 254 can be attached to the bottom of the top section 242 by means of a rivet 256 or another suitable fastener. If there is an excessive pressure build up above the top section of the cage member, a section of each relief valve member is able to move downwardly, thereby allowing the fluid or oil to flow through a respective valve port 260. This can occur when the central hole 244 is closed by the actuator and the by-pass valve ring 62.

Turning now to the alternate valve construction illustrated by FIGS. 21 to 23, this alternate by-pass valve is constructed in a manner similar to that illustrated in FIGS. 1 to 4 except for the differences now described. This embodiment is also provided with a spring cage member 270 which surrounds a return spring 70 and a coil-type relief valve spring 272. The cage member has a top member 274 shown separately in FIG. 23, this top member forming a by-pass valve seat which can be engaged by the by-pass valve ring 62. A plurality of elongate connecting members 276 are connected to and extend downwardly from the top member 274. The top end sections of the connecting members 276 can be formed with a reduced diameter, if desired for insertion in connecting holes 278 formed in the top member. The connecting members can be joined by threads formed on the top end section or they can be permanently attached such as by welding.

A planar spring seat 280 is mounted on the bottom ends of the connecting members so as to be spaced from the top member 274. Reduced ends of the connecting members or spacers 276 can extend into small holes 282 distributed around the circumference of the spring seat. The seat 280 can be secured to the connectors by any of several different methods of attachment, for example by threaded fasteners such as small nuts 284. To facilitate flow of oil or fluid through the spring seat, at least several openings 286 can be provided.

In the embodiment of FIG. 21, the spring 272 at its top end engages a single, annular relief valve member 288. This member can be guided by means of guide pins 290 extending from its top surface, these pins extending into guide holes 292 formed in the top member 274 (see FIG. 23). Arc-shaped relief valve ports 294 can be provided in the top member between the holes 292 and these ports are aligned with and above the valve member 288 which, in the closed position, seals these ports. Also shown in FIG. 23 is a central by-pass port 296 through which the return spring can extend. Excessive pressure build up in the chamber above the top member 274 will cause the relief valve member 288 to move downwardly against the force of the spring 272, thereby opening the relief ports 294.

A by-pass valve construction in accordance with the invention with forward flow pressure relief can be used either in a two bore valve construction for the valve housing or in a three bore valve construction. In a two bore valve construction, the valve chamber 48 is provided in a first bore having a wider diameter and a second bore of smaller diameter extends downwardly from the chamber. The by-pass flow can pass through this narrower bore from the chamber. In a three bore construction, the return spring 70 extends through the second bore which has a narrower diameter than the chamber 48 of the valve. This construction has a third bore extending downwardly from the second bore to connect to the main outlet port to the transmission and the inlet port from the cooler and this third bore is narrower than the second bore. The limitation of the three bore design is that the diameter of the third, narrow bore is for practical purposes limited to a maximum of 8 mm. The advantage of this valve construction however is that there is a low pressure drop achieved because the return spring does not interfere with fluid flow from the cooler to the transmission. An advantage of the above described spring enclosures or cage members is that it is possible to use a two bore by-pass valve construction while still having the bottom end of the return spring elevated so that it does not affect flow of fluid directly from the cooler to the transmission. Thus by use of the spring enclosure, the diameter of the narrower second bore can be greater than 5 mm. In addition this construction provides a more consistent pressure relief value over a range of operating temperatures compared to prior art by-pass valves.

While the present invention has been illustrated and described as embodied in several exemplary embodiments, e.g. embodiments having particular utility in providing forward flow pressure relief, it is to be understood that this present invention is not limited to the details shown herein, since it will be understood that various omissions, modifications, substitutions and changes in the forms and details of the disclosed by-pass valves and their operation may be made by those skilled in the art without departing in any way from the spirit and scope of the present invention. For example, those of ordinary skill in the art will readily adapt the present disclosure for various other applications without departing from the spirit or scope of the present invention.

We claim:

1. A by-pass valve for a heat exchanger circuit for cooling a heat exchange fluid, comprising:
   a valve housing formed with a valve chamber and having first and second ports for respectively supplying and returning said heat exchange fluid to and from said chamber and third and fourth ports for respectively supplying and returning said heat exchange fluid to and from a cooler;
   a thermally sensitive actuator mounted in said chamber and having a shaft section and a piston extending from a first end of said actuator, said piston being adapted to extend from or retract into said first end in dependence on the temperature of said shaft section, said piston extending into and held by a recess formed in said housing at one end of said chamber so that said shaft section is movable in said chamber in response to extension or retraction of said piston;

a spring enclosure mounted in a by-pass section of said chamber adjacent a second end of said actuator remote from said first end, said spring enclosure forming a valve seat having a by-pass port through which said heat exchange fluid can flow in a cold by-pass state of the valve and forming at least one pressure relief port;

at least one port closing device mounted in or on said enclosure and adapted under normal operating conditions to close said at least one pressure relief port;

a by-pass valve member mounted on said shaft section and movable by said actuator from a first position where said by-pass port is open to a second position where said by-pass port is closed by said by-pass valve member; and a return spring mounted in said enclosure and having one spring end engaging said actuator at said second end thereof so as to bias said shaft section away from said valve seat and the by-pass port, wherein, in the event of an excessive pressure build up in said chamber on the actuator side of said valve seat during use of the by-pass valve, said at least one port closing device moves to an open position and allows said heat exchange fluid to flow through said at least one pressure relief port and thereby reduce the pressure build up.

2. A by-pass valve according to claim 1 wherein said spring enclosure includes first and second enclosure sections detachably connected to each other, said first enclosure section forming said valve seat, which is annular and extends around said by-pass port, and said at least one pressure relief port, and said second enclosure section forming a seat for another spring which is part of said at least one port closing device.

3. A by-pass valve according to claim 1 including an override spring mounted on said actuator and biasing said by-pass valve member towards said valve seat and said by-pass port.

4. A by-pass valve according to claim 1 wherein said at least one port closing device include an annular port closing member movable in said enclosure and guided thereby and a spring biasing said port closing member to a closed position in which said port closing member closes said at least one pressure relief port.

5. A by-pass valve according to claim 4 wherein there are a plurality of said at least one pressure relief port distributed around said valve seat, there are corresponding plurality of port plugging ridges formed on said port closing member, and in the closed position of said port closing member, each of said ridges is received in a respective one of the pressure relief ports in order to close same in a sealing manner.

6. A by-pass valve according to claim 1 wherein said at least one port closing device is at least one flap valve member movably mounted in or on said enclosure and made of a resilient spring material which acts to bias said at least one flap valve member to a closed position.

7. A by-pass valve according to claim 1 wherein there are a plurality of said at least one pressure relief port, said at least one port closing device comprises a plurality of movable port closing members mounted in said enclosure, and said enclosure has a second spring mounted therein and extending around said return spring, said second spring engaging said port closing members and biasing said port closing members towards a closed position in which said plurality of pressure relief ports are closed.

8. A by-pass valve according to claim 7 wherein said spring enclosure comprises a unitary cage member forming said valve seat, which has a substantially planar, circular top and a plurality of said at least one pressure relief port formed therein, and having legs extending downwardly from said valve seat and perpendicular to the top of the valve seat, each of said legs having a radially inwardly extending foot, a bottom end of said second spring being supported by the feet of said legs.

9. A by-pass valve according to claim 1 wherein said spring enclosure comprises a cage member having a circular top member forming said valve seat and providing a plurality of said at least one pressure relief port, having a plurality of connecting members extending downwardly from said top member and rigidly connected thereto, and having a planar spring seat mounted on said connecting members and spaced from said top member, one end of said return spring engaging said spring seat so as to be held in said enclosure.

10. A by-pass valve for mounting between a transmission and a cooling unit used to cool a transmission fluid for said transmission, said valve comprising:

a valve housing having a valve chamber, first aperture means connected to said valve chamber for supplying and returning said transmission fluid to and from said transmission and second aperture means connected to said valve chamber for supplying and returning said transmission fluid to and from said cooling unit;

a thermally sensitive actuator mounted in said chamber and having an actuator body with opposite first and second ends and a piston extending from the first end, said piston being adapted to extend from said first end or retract into said body in dependence on the temperature of said body, said piston being adapted and arranged to engage said housing at one end of said valve chamber so that said body is linearly movable in said chamber in response to extension or retraction of said piston;

a valve seat member in said valve chamber adjacent said second end of the actuator, said seat member forming a by-pass opening through which said transmission fluid can flow in a first direction in a cold by-pass state of the valve and a pressure relief port arrangement through which said transmission fluid can flow in a reverse direction opposite said first direction;

a relief valve mechanism mounted in said valve chamber and movable between a closed position where said pressure relief port arrangement is closed and an open position where said pressure relief port arrangement is open, said relief valve mechanism being biased towards the closed position;

a by-pass valve member mounted in said valve chamber and movable by said actuator body from a by-pass position where said by-pass opening is open to a valve seat engaging position where said by-pass opening is closed; and a return spring having a first spring end engaging the second end of the actuator body and a second spring end engaging a supporting surface located within said chamber, said return spring biasing said actuator to a piston retracted position, wherein, in event of excessive pressure build up in a section of said chamber containing said actuator during use of the by-pass valve, said relief valve mechanism moves to its open position to allow said transmission fluid to flow through said pressure relief port arrangement and thereby reduce the pressure build up.

11. A by-pass valve according to claim 10 wherein said pressure relief port arrangement comprises a plurality of pressure relief ports distributed around an annular top section of said valve seat member, and said relief valve mechanism includes an annular ring member mounted below said annular top section and a coil-type spring having a top end engaging said ring member so as to bias said annular ring member to a relief port closing position.

12. A by-pass valve according to claim 10 wherein said relief valve mechanism is at least one flap valve member movably mounted in or on said valve seat member and made of resilient spring material which acts to bias said at least one flap valve member to a closed position.

13. A by-pass valve according to claim 10 including a spring seat member providing substantially planar spring seat and spaced-apart connecting legs extending between and connecting said spring seat and said valve seat member, said spring seat providing said supporting surface for the second spring end of the return spring, wherein said relief valve mechanism includes a relief spring, which extends around said return spring and also engages said spring seat, and said relief spring biases the relief valve mechanism towards said closed position.

14. A by-pass valve according to claim 11 wherein said annular top section has said by-pass opening forming centrally therein and at least several connecting legs extend perpendicular to said top section and are integrally connected thereto, said by-pass valve includes a spring seat member connected to free ends of said connecting legs and providing said supporting surface for the second end of the return spring, and said connecting legs are adapted to guide movement of said ring member towards or away from said relief port closing position.

15. A by-pass valve apparatus for a heat exchanger circuit for cooling a heat exchange fluid, comprising:
a by-pass valve device having a valve housing formed with a valve chamber with opposite first and second end sections, a first port for inflow of the heat exchange fluid into said second end section, a second port for outflow of the heat exchange fluid from said second end section to a cooler, a third port for outflow of the heat exchange fluid from said first end section, and a fourth port for inflow of said heat exchange fluid into said first end section from said cooler, a thermally sensitive actuator mounted in said chamber and adapted to extend or retract in dependence on its temperature which is influenced by the temperature of the heat exchange fluid during use of the valve apparatus, said actuator having a first end disposed in said second end section and a second end disposed towards said first end section, a by-pass valve seat provided in said valve housing, and a by-pass valve member mounted in said valve chamber and movable by extension or retraction of said actuator into engagement with or disengagement from said valve seat in order to open or close a by-pass port for flow of said heat exchange fluid from said second end section to said first end section;
a relief valve mechanism mounted in said valve chamber and having at least one relief valve member movable between a closed position where at least one pressure relief port is closed and an open position where said at least one pressure relief port is open, said at least one relief valve member being biased towards said closed position,
wherein, in the event of excessive pressure build up in said second end section of the chamber during use of the by-pass valve, the pressure of said heat exchange fluid in said second end section causes said at least one relief valve member to move to its open position and thereby reduce the excessive pressure.

16. A by-pass valve apparatus according to claim 15 wherein said actuator is a wax motor having a piston engaging an end of said valve chamber and a cylindrical body in which said piston is slidably mounted and from which said piston extends and a return spring located in said first end section and having one spring end engaging said actuator at a closed end thereof remote from said piston.

17. A by-pass valve device according to claim 16 including a spring enclosure mounted in said first end section of the chamber and having a first end forming said by-pass valve seat and a second end forming a spring seat.

18. A by-pass valve apparatus according to claim 17 wherein said first end of the spring enclosure also provides a plurality of said at least one pressure relief port and said at least one relief valve member is slidable valve ring mounted in said spring enclosure and guided thereby.

19. A by-pass valve apparatus according to claim 16 including a spring enclosure mounted in said first end section of the chamber and having a circular first end forming said by-pass valve seat, said by-pass port, and said at least one pressure relief port, and also having legs connected to and extending perpendicular to said first end and a spring seating arrangement attached to ends of said legs remote from the circular first end.

20. A by-pass valve apparatus according to claim 17 wherein said relief valve mechanism includes a relief valve spring which is mounted in said spring enclosure and extends around and is coaxial with said return spring, said relief valve spring having a first spring end engaging said at least one relief valve member and a second spring end engaging said spring seat at the second end of the spring enclosure.

* * * * *